US007823429B2

(12) United States Patent  (10) Patent No.: US 7,823,429 B2
Drewes et al.  (45) Date of Patent: Nov. 2, 2010

(54) METHOD FOR MANUFACTURING AN AXLE COMPONENT, AND AXLE COMPONENT WHICH IS MANUFACTURED AS A RESULT

(75) Inventors: Olaf Drewes, Aschaffenburg (DE); Rolf Spielmann, Wertheim-Bettingen (DE)

(73) Assignee: SAF-Holland GmbH, Bessenbach (DE)

( * ) Notice: Subject to any disclaimer, the term of this patent is extended or adjusted under 35 U.S.C. 154(b) by 317 days.

(21) Appl. No.: 12/089,840

(22) PCT Filed: Sep. 15, 2006

(86) PCT No.: PCT/EP2006/009021

§ 371 (c)(1),
(2), (4) Date: Apr. 10, 2008

(87) PCT Pub. No.: WO2007/042123

PCT Pub. Date: Apr. 19, 2007

(65) Prior Publication Data

US 2008/0250833 A1  Oct. 16, 2008

(30) Foreign Application Priority Data

Oct. 13, 2005 (DE) .................. 10 2005 049 050

(51) Int. Cl.
*B21D 26/02* (2006.01)
*B21D 28/26* (2006.01)
(52) U.S. Cl. .................................. 72/55; 72/58; 72/61
(58) Field of Classification Search ................ 29/421.1, 29/897.2; 72/55, 57, 58, 61
See application file for complete search history.

(56) References Cited

U.S. PATENT DOCUMENTS

| 5,445,001 | A  | * | 8/1995  | Snavely ........................ 72/55 |
| 5,735,156 | A  | * | 4/1998  | Yoshitomi et al. ............. 72/57 |
| 6,098,437 | A  | * | 8/2000  | Kocer et al. ................... 72/55 |
| 6,122,948 | A  | * | 9/2000  | Moses ........................... 72/61 |
| 6,349,615 | B1 | * | 2/2002  | Zimmer et al. ................ 72/61 |
| 6,487,886 | B2 | * | 12/2002 | Ueno et al. ................... 72/57 |
| 6,513,243 | B1 | * | 2/2003  | Bignucolo et al. ............ 72/61 |
| 6,519,855 | B1 | * | 2/2003  | Marando ................... 29/421.1 |
| 7,614,151 | B2 | * | 11/2009 | Miller ...................... 29/897.2 |

FOREIGN PATENT DOCUMENTS

| DE | 197 20 133 A1 | 11/1997 |
| DE | 196 48 091 A1 | 5/1998 |
| DE | 199 63 679 A1 | 7/2000 |

(Continued)

OTHER PUBLICATIONS

English Translation of International Preliminary Report on Patentability, Int'l. Application No. PCT/EP2006/009021.

*Primary Examiner*—David B Jones
(74) *Attorney, Agent, or Firm*—Price, Heneveld, Cooper, DeWitt & Litton, LLP

(57) ABSTRACT

The invention relates to a method for manufacturing an axle component having the following steps: arranging a hollow semi-finished product such as a tube in a die for forming the axle component; introduction of fluid into the interior of the hollow semi-finished product; and loading of the fluid with high pressure, in order to deform the hollow semi-finished product in accordance with the die as a result.

16 Claims, 3 Drawing Sheets

FOREIGN PATENT DOCUMENTS

| | | |
|---|---|---|
| DE | 199 11 125 C1 | 11/2000 |
| DE | 103 26 858 A1 | 1/2005 |
| DE | 103 30 314 A1 | 2/2005 |
| DE | 103 51 137 B3 | 2/2005 |
| EP | 0 760 265 A1 | 3/1997 |

* cited by examiner

METHOD FOR MANUFACTURING AN AXLE COMPONENT, AND AXLE COMPONENT WHICH IS MANUFACTURED AS A RESULT

BACKGROUND OF THE INVENTION (1) Field of the Invention

The present invention concerns a method for manufacturing an axle component.

(2) Description of Related Art

Traditionally, axle components such as wheel suspension arms are produced by various manufacturing methods. Examples of such manufacturing methods are casting, forging or welding. Furthermore, there is so-called hydroforming (internal high pressure forming, IHPF), wherein a hollow or tubular part is exposed to liquid pressure, so that the wall of the hollow part lies against a negative mold. However, this method suffers from the drawback that the hollow part has to be preformed and should only have a wall thickness of up to 2.5 mm in order for the hydroforming process (internal high pressure forming, IHPF) to be performed successfully. Furthermore, as a rule, a heat treatment must follow the preforming, in order to restore the material properties for the actual hydroforming process.

Accordingly, each of the traditional manufacturing methods for the production of an axle component with a relatively complex shape has the drawback of requiring many process steps in order to make the axle component. As a result, the costs are high for the production of the axle component.

SUMMARY OF THE INVENTION

The present invention provides an economical production method for an axle component.

A method according to the present invention may include the following steps:

arranging a hollow, non-preformed, semifinished product such as a tube in a negative mold for the forming of the axle component;

introduction of fluid into the interior of the hollow semifinished product; and loading the liquid with high pressure in order to deform the hollow semifinished product in accordance with the negative mold.

Preferably, the hollow semifinished product has a wall thickness of at least 2 mm, preferably 3 to 6 mm, most preferred of 4 to 5 mm.

Preferably, the pressure lies in the range of 1200 to 2500 bar ($120 \times 10^6$ Pa to $250 \times 10^6$ Pa) preferably in the range of 1800 to 2200 bar ($180 \times 10^6$ Pa to $220 \times 10^6$ Pa).

With the hydroforming according to the invention, a conventional semifinished part such as a round tube, an oval tube, or a square tube can be transformed directly into a final shape of the axle component, so that one step of preforming the semifinished part can be omitted. This is accomplished in particular due to the high pressure of the hydroforming method of the invention. Tubes with a wall thickness of more than two millimeters and up to more than five millimeters can be converted directly into a final shape of the axle component by the hydroforming method of the invention. Since the axle component does not have to be preformed, one prevents a local excessive strain, besides avoiding an additional work step. In this way, an axle component with high strength can be produced economically, requiring no further deformation step. Thus, one immediately obtains a closed-wall and highly durable cross section with no welds subjected to stress.

Preferably, at least two identical or mirror-symmetrical axle components are formed at the same time, and they are separated after the forming, so that one can make a plurality of axle components with just one forming process. This makes possible further cost reduction and time savings during production.

When at least two long axle components, such as wheel suspension arms, have a long shape and overlap in a lengthwise direction when forming the plurality of axle components, one can minimize an overhang at an inlet or outlet of the hydroform, so that excess material, which has to be removed after the forming, is likewise minimized. This results in a further cost benefit.

The method may be utilized to manufacture wheel suspension arms with spring seat extensions. Since such spring seat extensions have a smaller dimension in the direction of the vehicle's height axis Z than another segment of the wheel suspension arm, preferably two wheel suspension arms can be formed at the same time, and the wheel suspension arms can be formed in such a way that the spring seat extensions overlap in the lengthwise direction. After the forming, the two wheel suspension arms are then separated from each other. In this way, the material yield is a maximum.

Preferably, the mold for the forming of the axle component is configured such that the spring seat extensions are set off from each other to the side in one transverse direction of the wheel suspension arm.

Furthermore, the hydroforming method of the invention offers the benefit that, in the case of a wheel suspension arm, the spring seat extensions can easily be set off to the side by appropriate design of the negative mold in one transverse direction of the vehicle in the case of a trailing arm. As a result, for example, a trailing arm can be molded that has outstanding wheel steering properties, since the axle sockets of a pair of trailing arms have a large distance from each other and are situated near a wheel of the wheel suspension, while at the same time the springs are set off away from the wheel—looking in the direction toward the middle of the vehicle in the transverse direction of the trailing arm—so that the installation configuration of the springs can be improved. In other words, the trailing arms can be at maximum spacing from each other, while the springs can be arranged closer to each other.

Preferably, the method moreover has the step of welding a bushing into a joint socket for the pivotable fastening of the wheel suspension arm on a vehicle frame.

Preferably, the stiffness of a trailing arm produced by the hydroforming method of the invention is increased in that an essentially triangular piece is cut out from the pair of side walls at one end lying at the pivot axis of the trailing arm, and an upper or lower wall (upper or lower flange) or a tonguelike segment of the upper and lower wall resulting from the cutting out is bent toward a joint socket so that this upper or lower wall can be welded to the side walls of the trailing arm. In this way, one gains the benefit of achieving great rigidity of the trailing arm in the region of the pivot axis.

Furthermore, one or more indentations or bulges can be formed in the walls of the axle component produced by the hydroforming method of the invention. Such indentations and bulges can have virtually any desired shape, and they are best determined with a finite element method (FEM) in this regard. Only the mechanical properties of the starting material or semifinished material and especially the plastic deformability will be a constraint for this. Moreover, preferably, a part of the indentation or bulge can be cut out essentially in the middle thereof, if this middle segment only needs to withstand low forces, so that an axle component produced by the hydroforming method can have less weight.

A major advantage of the hydroforming method of the invention is that local rates of strain of the formed axle component do not exceed a given magnitude.

Furthermore, the hydroforming can achieve a closed cross section for an axle component, without there being any heavily loaded welded seams in the cross section. For example, a pair of trailing arms can be produced at the same time with only a single die and one stroke of the hydroforming device.

The invention shall now be explained more closely by means of sample embodiments in connection with the enclosed drawings. However, the sample embodiments show only the manufacture of a wheel suspension arm as an illustration. As the practitioner can easily discern, however, the invention can also be applied to other axle components and superstructure components of a vehicle.

DETAILED DESCRIPTION OF PREFERRED EMBODIMENTS

Figure 3:
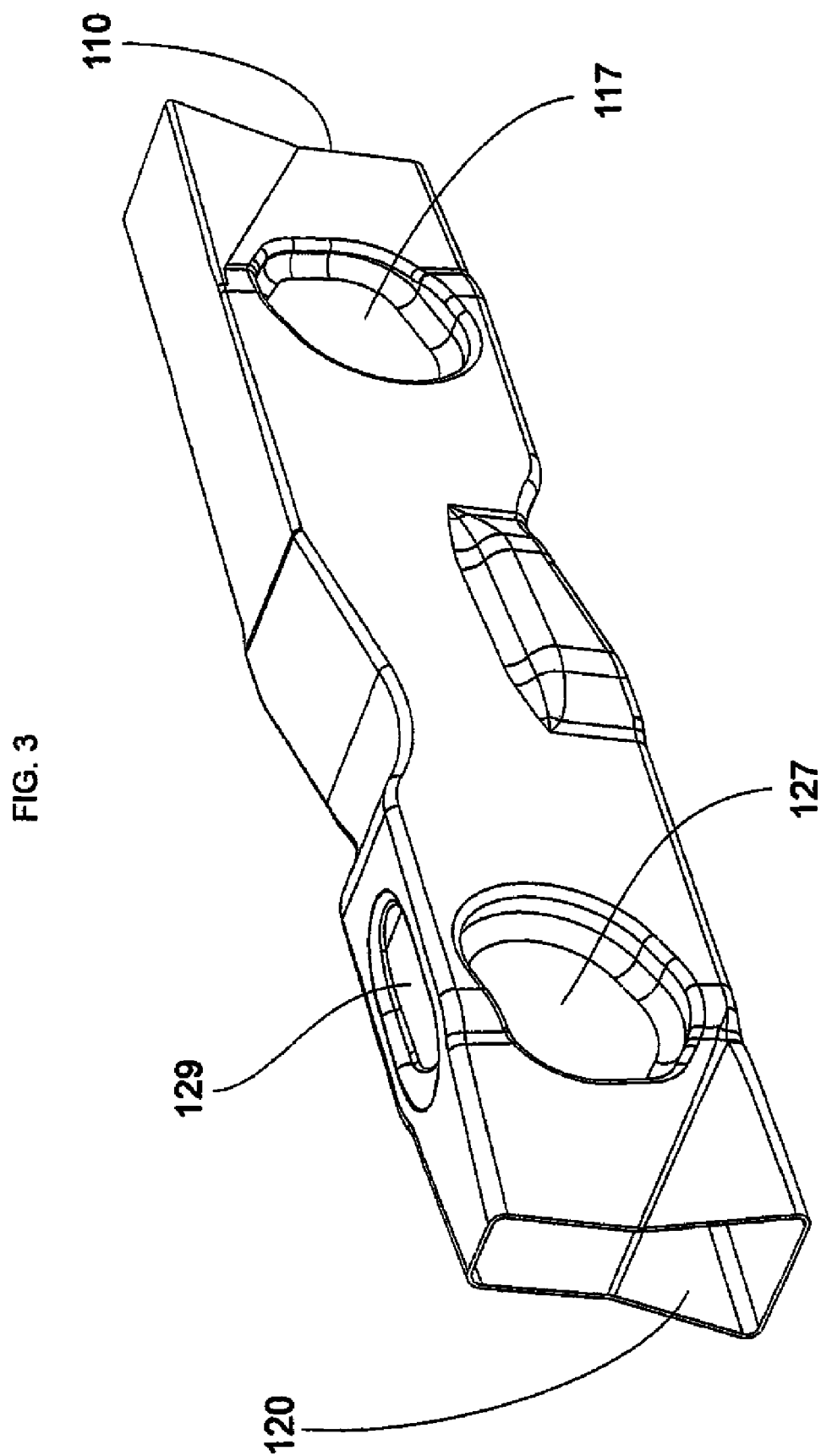
FIG. 3 shows a tube after the hydroforming, from which two basically identical or mirror symmetrical trailing arms can be cut out.

As is shown in FIG. 3, a hollow body is produced by hydroforming from a tube, preferably a round steel tube made of a steel with a high fracture strain in the region of around 10 to 15%, preferably around 10%. Suitable refined steel grades can be used when there are higher requirements on the fracture strain or the plastic deformability during the production process and/or the corrosion behavior. A multiphase steel can also be used if there are high demands on the strength of the hollow body. The described method offers additional benefits here in particular, since only a single deformation process is needed, so that a multiphase steel will preserve its additional strength. An additional deformation process, such as preforming, would rule out the prospect of using such steels. Likewise, nonferrous metals such as aluminum alloy with suitable material properties can also be considered as the material used for the semifinished blank. Furthermore, depending on the desired shape, one can also use a square tube, oval tube, or other tube cross sections as a semifinished blank for the hydroforming.

Figure 1:
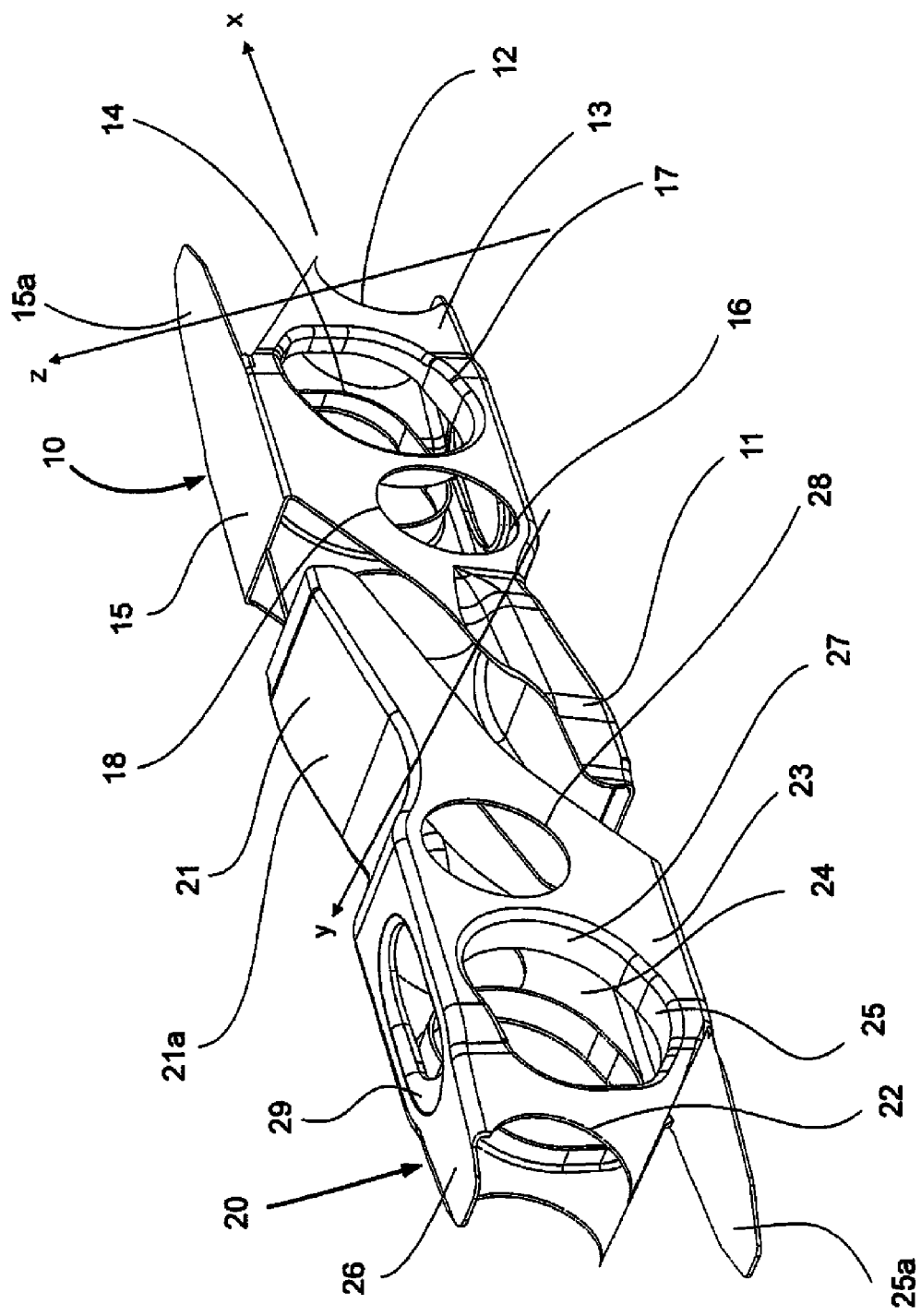
FIG. 1 shows a first sample embodiment of a trailing arm, in which a spring seat extension is arranged at basically the same height as a pivot bearing of the trailing arm.

After the hydroforming, it is still necessary to remove an excess at a front and rear end, which results from the inlet and outlet. From the hollow bodies shown in FIG. 3, one ultimately produces two trailing arms 10, 20, as shown in FIG. 1, by separating the hollow body of FIG. 3 in the middle according to the shape of the spring seat extensions 11, 21 of the pair of trailing arms 10, 20.

The shape of the trailing arms 10, 20 can be optimized by a finite element method, so that the trailing arms 10, 20 have a preferred bending and torsional rigidity and favorable tensile and compressive stress levels. To increase the rigidities, the trailing arms 10, 20 are provided with indentations 17, 27 and 28. In order to reduce the weight of the trailing arms 10, 20, a middle or central segment of the indentations 17, 27, 29 is removed, for example, by laser cutting. Furthermore, a bushing (not shown) for a pivot bearing of the trailing arm 10, 20 is welded to a joint socket 12, 22 already configured by the hydroforming. In order to improve the introduction of corresponding forces into the pivot bearing of the bushing of the trailing arm 10, 20 (not shown), a triangular piece is cut out from the side walls 13, 14 and 23, 24 of the pair of trailing arms 10, 20 at the end of the trailing arm 10, 20 in the vicinity of the joint socket 12, 22, again, for example, by laser cutting. After this, a tonguelike segment 15a, 25a of a lower wall or a lower flange 15, 25 of the trailing arm 10, 20 is bent toward the cutting edge of the side walls 13, 14 and 23, 24 and welded to the side walls 13, 14 and 23, 24. In this way, the tonguelike segment 15a, 25a of the lower walls 15, 25 can introduce corresponding tensile and compressive loads into the joint socket 12, 22.

In this way, one creates a trailing arm with a hollow profile, having no other highly loaded welded seams than the welded seam at the joint socket 12, 22 and the welded seam at the tonguelike segment 15a, 25a. Thus, a trailing arm 10, 20 with a hollow profile can be made by a simple method, having a minimum of welded seams. Depending on the configuration of the trailing arm 10, 20 or some other frame or wheel suspension component of a vehicle, one can totally eliminate the separating of the triangular parts to obtain the tonguelike segments 15a, 25a.

By making a pair of trailing arms 10, 20 with only one hydroforming step—unlike the molding of only one component—surplus material of an excess which results from the inlet or outlet is reduced to less than half. The reason is that the described method makes it possible to maintain the circumferential lengths of the tube ends 110, 120 on the same order of magnitude as the circumferential length of the semifinished blank. Thus, the method-related inlets and outlets can be kept very short. Since, what is more, the spring seat extensions 11, 21 have a smaller dimension in a vertical direction Z of the vehicle than the other segments of the trailing arms 10, 20, the spring seat extensions 11, 21 can overlap in the longitudinal direction X of the trailing arms 10, 20 during the hydroforming of the pair of trailing arms 10, 20. In this way, even more excess material is economized.

Figure 2:
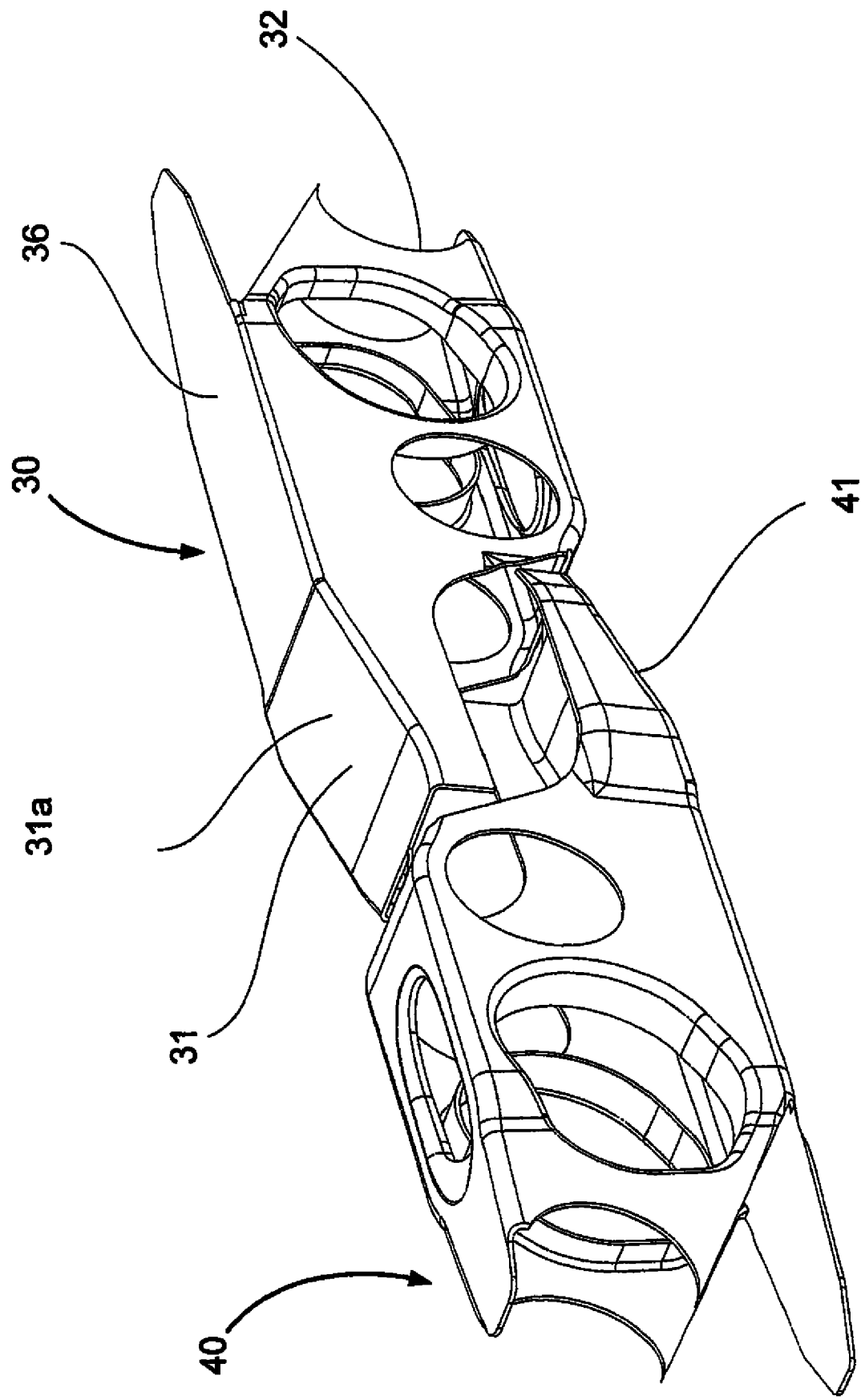
FIG. 2 shows an alternative sample embodiment in which, contrary to the sample embodiment shown in FIG. 1, a spring seat extension is arranged higher than a joint axis of the trailing arm.

FIG. 2 shows an alternative sample embodiment, likewise of trailing arms 30, 40 for a wheel suspension of a vehicle. The trailing arms 30, 40 shown in FIG. 2 have essentially the same components as the trailing arms 10, 20 of FIG. 1. Therefore, these elements have been given the same reference numbers and shall not be further discussed here. We shall therefore only go more closely into the difference between the trailing arms 30, 40 of FIG. 2 and the trailing arms 10, 20 of FIG. 1.

For the trailing arms shown in FIG. 1, a spring seat extension 11, 21 lies essentially at the same height in a vertical direction Z of the vehicle as the joint socket 12, 22. In other words, an upper wall 21a of the spring seat extension 21 basically forms a linear or horizontal extension of an upper wall 26 of the trailing arm 20. The same holds for the other trailing arm 10 of FIG. 1, since the trailing arms 10, 20 are fashioned to be identical or mirror symmetrical. In contrast to this, an upper wall 31a of a spring seat extension 31 of the trailing arm 30 forms an extension of a lower wall 36 of the trailing arm 30. In this way, a spring seat extension 31 and thus its upper wall 31a can be situated higher than a joint socket in a vertical direction Z of the vehicle. In this way, the riding height, i.e., the distance between the lower edge of the chassis and the axle center of a particular vehicle and/or a spring installation configuration can be varied from the first sample embodiment. In other respects, the pair of trailing arms 30, 40 of FIG. 2 is configured exactly the same as the pair of trailing arms 10, 20 of FIG. 1.

Basically, the spring seat extensions 31 can also be very short or eliminated entirely. In this case, the springs (not shown) are supported against the axle tube (not shown) and/or partly against the very short spring seat extensions 31. In this design, little or no offset bending is needed for the trailing arms 10, 20, 30, 40. Hence, the length of the material can be further reduced, since the overall length of the thus produced trailing arms 10, 20, 30, 40 is also smaller.

The method for manufacturing these trailing arms 10, 20, 30, 40 will now be explained in detail. First, a tube of suitable material with good deep drawing properties, i.e., with a strain fracture of at least 10%, is placed in a negative mold made of steel configured according to the shape of the trailing arms 10, 20, 30, 40 being manufactured. After this, both ends of the tube are tightly closed and liquid is filled into the tube. This liquid is now placed under a high pressure of around 1800 to 2200 bar by a pressure generating device. Due to this high pressure, the material of the steel tube flows and conforms to the wall of the negative mold, adopting its shape.

After this, the thus-formed hollow part can be removed from the negative mold after the pressure is released and the liquid is drained. Excess parts of an inlet or outlet of the negative mold are removed from the molded hollow part by sawing or a laser treatment, so that one gets a hollow part as shown in FIG. 3.

Water with suitable additives is used preferably as the liquid for the hydroforming of the hollow part.

The hollow part shown in FIG. 3 is then cut along a roughly S-shaped line in the middle, so that a pair of identical or mirror symmetrical trailing arms 10, 20 or 30, 40, as shown in FIGS. 1 and 2, are formed.

Afterwards, a joint bushing (not shown) is placed in a joint socket 12, 22 of the trailing atm 10, 20, for example, it is welded. In order to further improve the bending and torsional strength of the trailing arm 10, 20, an essentially triangular part can further be cut out from the side walls 13, 14 or 23, 24 in the vicinity of the joint socket 12, 22.

Then, a tonguelike segment 15a, 25a of the lower wall 15, 25 is bent upward to the joint socket 12, 22 so that the tonguelike segment 15a, 25a can be welded to the side walls 13, 14 or 23, 24.

In order to save on weight and/or to create room for further running gear components, a central segment of the indentations 17, 27, 29 is then cut out, for example, by means of a laser. The essentially circular axle sockets 18, 28 are cut out from the trailing arms 10, 20, e.g., by means of a laser.

After this, cover plates are placed on the spring seat extensions to accommodate the springs (not shown) for the trailing arms 30, 40 shown in FIG. 2. These plates can be secured preferably by welding, and these welded seams are not subject to any increased strain.

The invention is not confined to the trailing arms 10, 20, 30, 40 described here. In particular, other wheel suspension components such as transverse links, tilted links, and space rods can also be made with the method of the invention. Furthermore, frames and structure or chassis components can also be made with the invented method. The wall thickness of the tube is 3 to 4 mm prior to the hydroforming, but due to the high pressure of 1800 to 2200 bar, a tube with 5 to 6 mm wall thickness can also be formed. The shape will be determined in advance, for example, by a finite element method, so as to achieve a high tensile, compressive, flexural and torsional strength of the finished trailing arm, on the one hand, and to avoid segments with excessive strain, on the other hand.

Although not shown here, the trailing arm can also have a shape wherein the spring seat extension 11, 21 is set off inwardly in the vehicle's transverse direction Y. In this way, on the one hand, the axle can be supported by the trailing arms 10, 20 near the wheels of the vehicle, while on the other hand the springs can be moved inward toward the middle of the vehicle, so that the installation conditions for the springs can be varied at will.

The invention claimed is:

1. A method for manufacturing an axle component such as a wheel suspension arm, the method comprising:
   arranging a hollow tubular member in a negative mold for the forming of the axle component;
   introducing fluid into the interior of the hollow tubular member;
   loading the liquid with high pressure in order to deform the hollow tubular member at least partially in accordance with the negative mold, and wherein at least two substantially identical elongated axle components having portions thereof that overlap in a lengthwise direction are formed at the same time, by the negative mold;
   separating the two substantially identical elongated axle components after the two substantially identical elongated axle components are formed in the negative mold.

2. The method of claim 1, wherein:
   the hollow tubular member has a wall thickness of about 3 mm to about 6 mm.

3. The method of claim 1, wherein:
   the pressure is in the range of $120 \times 10^6$ Pa to $250 \times 10^6$ Pa.

4. The method of claim 1, wherein:
   the axle components comprise wheel suspension arms, each having a first portion defining a first height, and a second portion defining a second height that is substantially less than the first height, the second portions forming spring seat extensions.

5. The method of claim 4, wherein:
   the negative mold is configured such that the spring seat extensions are set off from each other to the side in one cross section of the wheel suspension arm.

6. The method of claim 4, including:
   forming at least one joint socket in each axle component; and
   welding a bushing into the sockets to provide for pivotable fastening of the wheel suspension arm on a vehicle frame.

7. The method of claim 1, wherein:
   the axle components define opposite side walls; and upper and lower walls, and including:
   cutting out the opposite side walls at an end of each axle component in a lengthwise direction of each axle component to form cut edges;
   bending a selected one of the upper and lower wall adjoining the side walls so that the one of the upper and lower wall lies adjacent at least one cut edge of the side walls; and
   welding along the cut edge.

8. The method of claim 7, including:
   forming at least one indentation on at least one side wall of the axle component; and
   cutting out a bottom portion of the indentation.

9. The method of claim 1, wherein:
   the elongated axle components are formed to include deformed surface portions comprising indentations.

10. The method of claim 1, wherein:
    the elongated axle components are formed to include deformed surface portions comprising bulges.

11. The method of claim 1, wherein:
the hollow tubular member is made of a multiphase steel material.

12. The method of claim 1, wherein:
the hollow tubular member has a circular cross-sectional shape prior to being deformed.

13. The method of claim 1, wherein:
a central portion of the hollow tubular member is cut along a cut line that is non-linear.

14. The method of claim 13, wherein:
the cut line is generally S-shaped.

15. The method of claim 1, wherein:
the hollow tubular member has a wall thickness in the range of about 3 mm to about 6 mm.

16. The method of claim 15, wherein:
the hollow tubular member has a wall thickness in the range of about 4 mm to about 5 mm.

* * * * *

UNITED STATES PATENT AND TRADEMARK OFFICE
CERTIFICATE OF CORRECTION

PATENT NO.         : 7,823,429 B2                                            Page 1 of 1
APPLICATION NO.    : 12/089840
DATED              : November 2, 2010
INVENTOR(S)        : Olaf Drewes et al.

It is certified that error appears in the above-identified patent and that said Letters Patent is hereby corrected as shown below:

Column 5
Line 36, "atm" should be -- arm --.

Signed and Sealed this
Twenty-second Day of March, 2011

David J. Kappos
*Director of the United States Patent and Trademark Office*